United States Patent [19]

Milbrandt

[11] Patent Number: 4,803,500

[45] Date of Patent: Feb. 7, 1989

[54] INK PRINTER MEANS COMPRISING INTERCHANGEABLE INK HEADS

[75] Inventor: Artur Milbrandt, Munich, Fed. Rep. of Germany

[73] Assignee: Siemens Aktiengesellschaft, Berlin and Munich, Fed. Rep. of Germany

[21] Appl. No.: 66,069

[22] Filed: Jun. 24, 1987

[30] Foreign Application Priority Data

Jul. 4, 1986 [DE] Fed. Rep. of Germany ....... 3622506

[51] Int. Cl.[4] .............................................. G01D 15/16

[52] U.S. Cl. ................................. 346/140 R; 400/126

[58] Field of Search .................... 346/1.1, 140 PD, 75, 346/140 R; 400/126, 175

[56] References Cited

U.S. PATENT DOCUMENTS

| | | | |
|---|---|---|---|
| 4,320,406 | 3/1982 | Heinzl . | |
| 4,329,698 | 5/1982 | Smith | 346/140 PD |
| 4,411,540 | 10/1983 | Nozaki et al. | 400/175 |
| 4,439,775 | 3/1984 | Johnson . | |

FOREIGN PATENT DOCUMENTS

| | | | |
|---|---|---|---|
| 0159402 | 12/1984 | European Pat. Off. . | |
| 0160645 | 10/1982 | Japan | 400/175 |
| 0000984 | 1/1985 | Japan | 400/175 |
| 3346379 | 7/1985 | Netherlands | 400/175 |
| 1604577 | 12/1981 | United Kingdom . | |
| 2158778 | 11/1985 | United Kingdom . | |

OTHER PUBLICATIONS

Craft, "Low Cost Cartridge Code Detector", IBM Disclosure Bulletin, vol. 25, No. 4, 9/82.

*Primary Examiner*—E. A. Goldberg
*Assistant Examiner*—Huan H. Tran
*Attorney, Agent, or Firm*—Hill, Van Santen, Steadman & Simpson

[57] ABSTRACT

An ink printer means suitable both for multi-color as well as for single-color printing. To this end, the ink printer head is interchangeably designed. A common drive circuit that is connected to the ink printer head via a coding matrix is used both for the color printing as well as for the single-color printing. The coding matrix can be directly allocated to the ink printer head or, on the other hand, it can be composed of a switchable connector strip into which the terminal elements of the ink printer head engage.

4 Claims, 2 Drawing Sheets

INK PRINTER MEANS COMPRISING INTERCHANGEABLE INK HEADS

BACKGROUND OF THE INVENTION

1. Field of the Invention

The invention is directed to an ink printer means for multi-color printing of a recording medium.

2. Description of the Prior Art

As known, individual ink droplets are sprayed from one or more nozzles of an ink printer head against a recording medium for representing characters or graphics patterns. Such ink printer means are disclosed, for example, by European Pat. No. 01 59 402.

A frequent requirement for the practical employment of ink printer means is that the characters be represented with various, differing print quality. A distinction is made between what is referred to as draft quality, a standard quality and what is referred to as letter quality. The latter is also frequently referred to by the expression "near-letter-quality". For achieving various print qualities, it is known (German Published application No. 33 07 196) to vary the printing speed, i.e. to double the printing speed in comparison to the printing speed provided for the representation of characters in a standard quality and to thereby eject an ink droplet in only every second column of the matrix. It is also known from the cited European patent application No. 01 59 402 to vary the droplet volume of the ejected ink droplets dependent on the selected print quality.

Ink printer means are known both for printing in black-and-white as well as for multi-color printing. Such an ink printer means for multi-color printing of a recording medium is disclosed, for example, by European Pat. No. 00 21 389. A respectively prescribed plurality of nozzles of the ink printer head is supplied with ink of the same color. The inks are contained in ink reservoirs that are arranged perpendicular to the recording medium in succession at the backside of the ink printer head. The recording medium is printed in line-by-line fashion in a printing station and is shifted by a respective subline between two printing events, the width of this sub-line corresponding to the plurality of nozzles having ink of the same color that are arranged in proximity above one another. Such ink printer heads for color printing have a plurality of individual nozzles, for example 24 individual nozzles per head, that are arranged in six rows of four nozzles each. Three rows of the nozzles serve for the black-and-white representation and three rows serve for the color representation. One row thereby prints magenta red, another yellow and another row prints the color cyan blue.

SUMMARY OF THE INVENTION

An object of the invention is to provide an ink printer means of the type described above that enables both color printing and also enables high-quality black-and-white printing to be produced.

In an ink printer means of the type initially described this object is achieved wherein an ink printer head is provided on a printer carriage movable in line fashion via a drive means in a print mode, whereby the ink printer head contains a plurality of nozzles from which ink is ejected onto the recording medium to be printed, and whereby the nozzles of the ink printer head are individually driven via control circuit, whereby the ink printer head on the printer carriage is interchangeabley fashioned via a retaining mechanism, whereby a first type of ink printer head is allocated to single color ink printing and a second type of ink printer level is preferably allocated to the multi-color ink printing.

In that the ink printer head on the printer carriage is interchangeably fashioned via a retaining mechanism, whereby a first type of ink printer head is allocated to the single-color ink printing and a second type of ink printer head is allocated to the multi-color ink printing, a color printing of lower quality and a black-and-white printing of high quality can be produced in a simple way.

The invention is thereby based on the perception that the same drive arrangement can be used both for ink printer heads having a color impression as well as for ink printer heads that are only suitable for black-and-white: Given a low software drive outlay, the hardware needed for the ink head for color impressions can thus be exploited, after replacement of the ink printer head, in order to use an ink printer head for single-color representation that comprises extremely high resolution in comparison to traditional ink printer heads.

With such an ink printer head, the print quality can be significantly enhanced given a speed comparable to traditional ink printer heads or, on the other hand, the printing speed can be significantly increased.

In an advantageous embodiment of the invention, a coding matrix is arranged between the actual drive circuit of the printer means and the interchangeable ink head, this coding matrix automatically producing the corresponding connections to the drive arrangement when changing from an ink printer head of the one type to an ink printer head of the other type (multi-color). For example, this coding matrix can be composed of a logical circuit arrangement allocated to the ink printer head or, on the other hand, it can be executed in a simple way as a plug connector, whereby the individual plug contacts are in communication with plug-in switches that close the corresponding connections when the ink head is plugged into the retaining mechanism.

BRIEF DESCRIPTION OF THE DRAWINGS

An embodiment of the invention is shown in the drawings and shall be set forth in greater detail below by way of example. Shown are.

DESCRIPTION OF THE PREFERRED EMBODIMENTS

Figure 1:
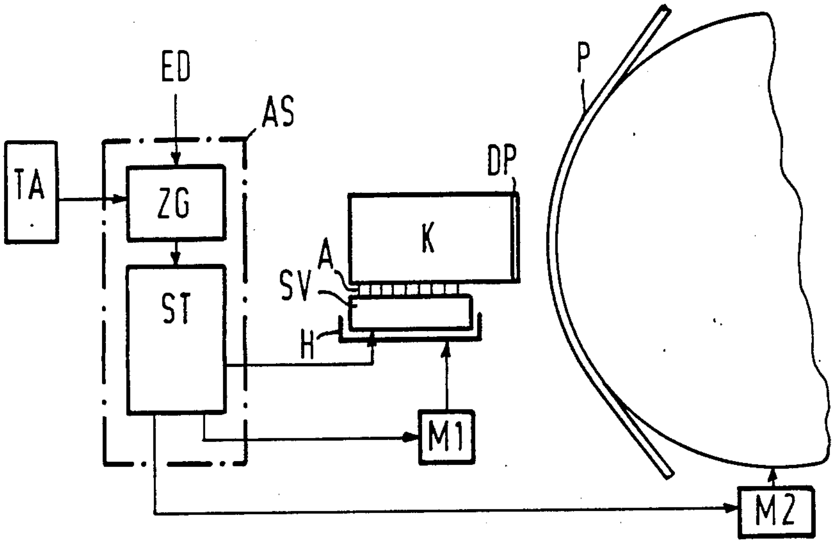
FIG. 1 is a schematic illustration of a block circuit diagram of the ink printer means of the invention.

The ink printer means of the invention shown in FIG. 1 is composed of the actual ink printer head K which, for example, is a plastic member that contains a plurality of ink channels that end at a nozzle plate DP in the direction toward a recording medium P. Every ink channel has a transducer (not shown here) allocated to it that can be driven in pulsed fashion via an electronic controller ST. Dependent on a drive pulse, a deformation of the transducers occurs that leads to the ejection of an individual ink droplet. The formation of the drive pulses, for example, ensues with appropriate signals that correspond to a character pattern stored in a character generator ZG. The character generator contains the patterns needed for the representation of characters, these patterns being called in accord with the input data ED. These input data ED can also derive from a keyboard TA. The signals for the movement of the ink printer head K and of the recording medium P are also output via the control circuit ST. The control circuit ST and the character generator ZG form a control drive means or control drive circuit AS. Two drive means are provided for moving the printer head K and the recording medium P, namely a first motor M1 for the movement of the ink printer head K and a second motor M2 for the movement of the recording medium P. The ink printer head is moved in line fashion, i,e. horizontally along a line, across the recording medium P via the first motor M1. The second motor M2 serves for the line-by-line transport of the recording medium P. The ink printer head K is interchangeably fashioned and has its terminals A projecting into a plug connector strip SV acting as a coding matrix. This plug connector strip SV is secured on a mount H of the printer carriage driven via the motor M1.

Two types of ink printer head (FIG. 2, FIG. 3) can then be used by the described ink printer means. The ink printer head for multi-color printing for which the drive means AS is actually designed as character generator and control means contains, for example, three rows arranged offset relative to one another of four individual nozzles DUE each for black-and-white printing (FIG. 3, SW) and three rows of four nozzles each for color printing, whereby one row is provided for cyan blue c, one row is provided for magneta red m and one row is provided for yellow y.

Figure 2:
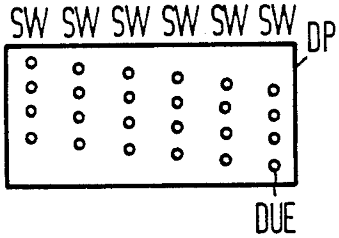
FIG. 2 is a schematic illustration of the nozzle plate of an ink printer head for single-color print mode.
Figure 3:
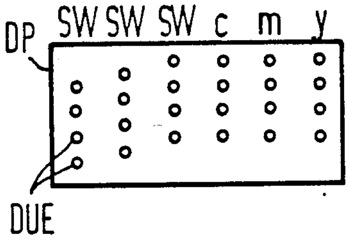
FIG. 3 is a schematic illustration of a nozzle plate of an ink printer head for multi-color print mode.

When such an ink printer head for multi-color printing is replaced by an ink printer head for single-color printing of FIG. 2 by simple interchange, 24 print nozzles being likewise arranged therein in six rows of four print nozzles offset relatively to one another, then no modification of the hardware drive arrangement AS is needed, since the plug connector SV automatically manages the appropriate combinations. Upon transition from a multi-color print head to a single-color print head (FIG. 3 to FIG. 2), the quality of the print image is considerably improved over the multi-color print head as a result of the increased number of print nozzles per unit of length. Instead of an improvement in the print quality, the increased plurality of print nozzles can also be used to increase the printing speed or, respectively, to both increase the printing speed as well as to improve the print quality.

Given employment of print heads in accord with FIG. 2 wherein 24 nozzles DUE are arranged in six rows, a complete print line can be produced with a single line-wise movement. It is not necessary to execute a plurality of line movements.

Figure 4:
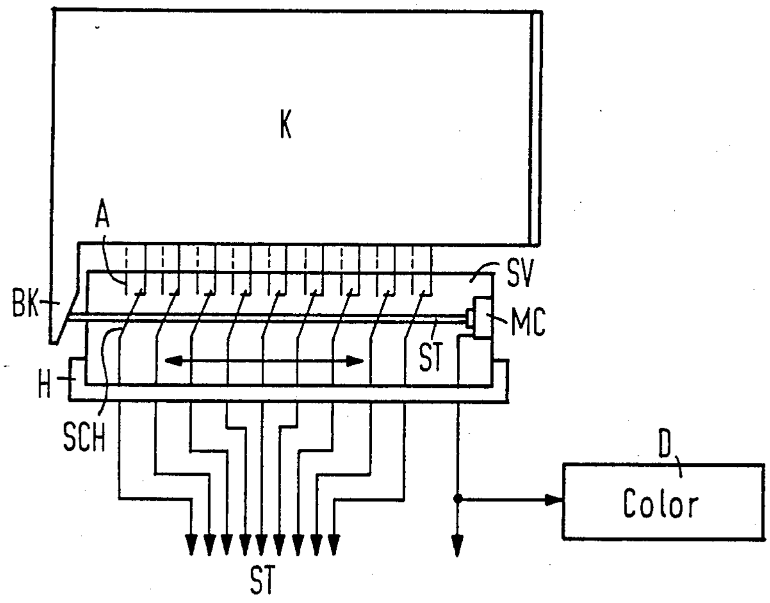
FIG. 4 is a schematic illustration of an ink print head fashioned as a color print head that is locked in the mount of a carriage.

In the illustrated exemplary embodiment of FIG. 4, the coding matrix SV is composed of a plug connector that comprises a multitude of plug contacts A at its upper side that are arranged such that both color print heads as well as print heads for single-color printing can be latched therein.

In order to assertain whether a color print head or a print head for single-color printing is involved, for example, the color print head includes a shoulder in the form of an actuating edge BK at its back edge, this actuating edge BK interacting with a ram ST that is movably arranged in the plug connector SV. When the color print head is put in place, the actuating edge BK presses the movable ram ST against a micro switch MC whose switch status is sensed by the central control ST and activates a display D. This display can be arranged in the region of the keyboard or at the printer itself, so that the operator can identify the operating status of the printer at the displayed characters (color). The ram ST is connected to a series of switches SCH that can be actuated with the assistance of the ram ST.

In a first operating condition that is allocated to printing with a single color, the ram is in contact with the terminal elements A shown with broken lines. When the color print head is plugged on, the switches SCH are correspondingly switched via the ram and connected to the contacts shown with solid lines. The correct connection of the drive means AS to the print head thereby automatically derives.

In FIG. 4, the coding matrix is composed of a plug connector SV, whereby the coding matrix contains simple through connections. However, it is of course also possible to arrange a complete coding network in the plug connector SV, for example a standard diode matrix of the type that can be provided in every keyboard. The switching, too, can itself be carried out in an electronic way in that, for example, a micro switch senses the shoulder BK and thus activates corresponding switchover elements in the coding matrix SV, for example switching transistors, etc., that then undertake the corresponding switching.

What is therefore understood by a switchable plug connector SV is both an electronically controlled switchover means as well as the mechanically actuatable switchover means that is shown. Such switchover means, however, are standard and known, for example in terminals or other communications terminal equipment.

Further, the coding matrix is not of critical significance for the invention because its function can also be assumed by the controller ST. It is thus conceivable that the controller ST, micro computer-controlled, automatically acquires the differing number of plug contacts between color print head and print heads comprising single-color printing and itself undertakes the corresponding switching in the controller ST via the micro processor.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An ink printer means for multi-color printing of a recording medium comprising an ink printer head provided on a printer carriage movable in line-fashion via a drive means in a print mode, said ink printer head containing a plurality of nozzles from which ink is ejected onto the recording medium to be printed, said nozzles of the ink printer head being individually driven via a multi-color control drive circuit, said ink printer head on the printer carriage being interchangeably mounted via a retaining mechanism, a first type of ink printer head being allocated to single-color ink printing and a second type of ink printer head being allocated to the multi-color ink printing and a sensing means for sensing the type of ink printer head used and, dependent thereon, switching a coding matrix connecting the nozzles to the multi-color drive circuit.

2. An ink printer means according to claim 1, wherein said sensing means actuates a display means.

3. An ink printer means according to claim 1, wherein the coding matrix is allocated to the ink printer head.

4. An ink printer means according to claim 1, wherein the retaining mechanism comprises a switchable plug connector.

* * * * *